Patented Oct. 24, 1933

1,931,806

UNITED STATES PATENT OFFICE 1,931,806

PROCESS FOR THE PRODUCTION OF SULPHURIC ESTERS OF NITROGEN-CONTAINING ORGANIC COMPOUNDS

Heinrich Ulrich and Paul Koerding, Ludwigshafen-on-the-Rhine, Germany, assignors to I. G. Farbenindustrie Aktiengesellschaft, Frankfort-on-the-Main, Germany No Drawing. Application December 22, 1931
Serial No. 582,652, and in Germany December 27, 1930

26 Claims. (Cl. 260—98)

The present invention relates to the production of agents suitable for use as assistants in the textile and allied industries.

We have found that substances suitable for use as assistants in the textile and allied industries and very suitable specifically as wetting, washing, dispersing, softening and like agents, can be obtained in a simple manner by acting in the presence of metal compounds having an alkaline reaction on sulphuric esters of hydroxy-alkyl amines, which contain at least one hydrogen atom attached to a nitrogen atom, with organic halogen compounds corresponding to the formula R—COX, in which X is a halogen atom and R any organic radicle.

Since the sulphuric esters of hydroxy-alkyl amines may readily be prepared in a pure form and the condensation with the organic halogen compounds proceeds under very mild conditions, the process according to the present invention leads to products of a homogeneous nature.

As sulphuric esters of hydroxy-alkyl amines which are suitable for the said conversion may be mentioned for example the sulphuric esters of mono- or diethanol amine, N-butyl-N-ethanol amine, mono- or di-N-gamma-hydroxybutyl amines, N-ethyl mono-propanol amine, N-lauryl mono-ethanol amine, di-isopropanol amine $HN=(CH_2—CH(OH)—CH_3)_2$, beta-ethylhexyl-butanol amine

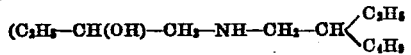

obtainable from γ-butylene oxide and β-ethylhexyl amine), N-phenyl- or cyclohexyl-N-ethanol amine and N-octyl-N-ethanol amine. Furthermore the sulphuric esters of hydroxy-alkyl amines containing several nitrogen atoms in the molecule, such as mono- or di-ethanol-ethylene diamine and the like, are suitable.

The organic halogen compounds suitable for the said process are for example acetic acid chloride, propionic acid chloride, phthalic acid chloride, halides of fatty acids of vegetal origin such as oleic acid chloride, coconut oil fatty acid chloride, palmitic acid chloride, stearic acid chloride, chloro-formic esters, as for example lauryl or amyl chloro-formates, acetic acid bromide, stearic acid bromide and like compounds which may also contain further substituents as for example hydroxyl groups.

The reaction is carried out in aqueous alkaline solutions, such as an aqueous solution of caustic soda or potash, at low temperatures, such as between about 10° below zero C. and about 75° C., preferably between about 20° and about 40° C., whereby preferably 2 equivalent proportions of metal compounds having an alkaline reaction are used for each molecular proportion of the sulphuric ester of a hydroxy-alkyl amine in order to neutralize the hydrogen halide formed. Generally, about 10 per cent less than 1 molecular proportion of the said organic halogen compounds are employed for each molecular proportion of the esters. The metal compounds having an alkaline reaction comprise for example alkali metal and alkaline earth metal oxides, hydroxides, carbonates and acetates, such as sodium, potassium, barium, calcium or strontium hydroxides, carbonates or acetates; moreover, magnesium oxide or carbonate, aluminium hydroxide or acetate, or sodium silicate may be employed. We prefer, however, to employ sodium or potassium hydroxides. Water-soluble solvents, as for example ethyl alcohol, glycerol or dioxane may be employed present in the reaction mixture.

The resulting sulphuric esters and their alkali metal and earth-alkaline metal salts are water-soluble products which are quite stable against hydrolysis by dilute aqueous solutions of acids and of alkalies even at the boiling temperature. They may be employed for a great variety of purposes, especially as washing, wetting and dispersing agents, in the textile industry, for combating pests or for pharmaceutical purposes. Dyestuffs into which a -COX group as above defined has been introduced may also be rendered water-soluble by the introduction of the hydroxy-alkyl amino-sulphuric ester groups in the said manner.

The products obtainable in the said manner may be advantageously employed together with other substances. For example they are suitable as washing agents and the like either alone or together with organic solvents, as for example carbon tetrachloride, benzyl alcohol, cyclohexanol, cyclohexanone, ethylene or propylene glycols or ethylene glycol ethers. They may also be employed together with salts, as for example sodium sulphate, sodium bicarbonate, perborates and the like. For many purposes, especially for the preparation of emulsions, it is advantageous to employ the said sulphuric esters together with glue or gum-like substances. The employment of the said sulphuric esters in combination with other washing, emulsifying, wetting and the like agents, as for example soaps, Turkey red oils, true sulphonic acids of organic compounds or condensation products from acid chlorides and hydroxy-alkyl sulphonic acids, is frequently of advantage.

The following examples will further illustrate the nature of this invention but the invention is not restricted to these examples. The parts are by weight.

Example 1

95 parts of mono-ethanol amine sulphuric ester are dissolved in 200 parts of water. After adding 110 parts of a 50 per cent aqueous caustic soda solution, 190 parts of stearic chloride are slowly introduced while stirring continuously, whereby the temperature is kept at about 10° C. by cooling. The paste of the sodium salt of stearic acid hydroxy-ethylamide sulphuric ester obtained after the reaction is completed may be directly employed as a wetting, washing or softening agent for artificial silk or cotton and like textile purposes.

The constitution of the product obtainable in the said manner is as follows:

$$C_{17}H_{35}-CO-NH-CH_2-CH_2-O-SO_3Na.$$

If 2 grams of the product be added to each litre of a dyeing bath for dyeing artificial silk, the dyed and dried silk shows a soft and supple touch.

Example 2

66 parts of calcined soda and 150 parts of water are added to 260 parts of an aqueous solution of n-butyl-amino-ethanol sulphuric ester (obtainable by acting with ethylene oxide on n-butylamine and by treating the resulting N-n-butyl-N-ethanol amine with chlorosulphonic acid.) 120 parts of coconut oil fatty acid chloride are added to the solution at about 35° C. A viscous emulsion is formed which is readily soluble in water and which is suitable as a wetting agent in acid and alkaline baths.

Example 3

40 parts of caustic soda and 80 parts of secondary amino-butanol sulphuric ester $$(NH_2-CH_2-CH_2-\underset{\underset{CH_3}{|}}{C}H-O-SO_3H,$$

obtainable by acting with chlorosulphonic acid on iso-butanol amine) are dissolved in 100 parts of water and 60 parts of chloro-formic n-butyl ester are allowed to flow into this solution. The temperature is preferably kept between 15° and 25° C. The acid salt thus formed has the constitution:

$$C_4H_9-O-OC-NH-CH_2-CH_2-\underset{\underset{CH_3}{|}}{C}H-O-SO_3Na$$

and may be employed as a wetting agent for mercerizing liquors.

Example 4

900 parts of oleic chloride are added at 20° C., while stirring, to a solution of 500 parts of amino-mono-ethanol sylphuric ester and 250 parts of caustic soda solution in 1300 parts of water. The reaction mixture is then stirred for 1 hour whereby an about 40 per cent paste of the sodium salt of oleyl mono-ethanol amide sulphuric ester $$(C_{17}H_{33}CO-NH-C_2H_4-O-SO_3Na)$$

is obtained which may be directly employed, even with hard water, as a highly efficient washing and wetting agent.

Example 5

136 parts of N-n-butyl-N-ethanol amine sulphuric ester are introduced into a solution of 56 parts of caustic soda in 550 parts of water. 225 parts of the chloro-carbonic ester of octodecyl alcohol are allowed slowly to run in, while stirring, at from about 20° to 30° C. After the reaction has been completed the sodium salt of the sulphuric ester of N-n-butyl-N-hydroxy-ethyl octodecyl urethane is obtained in the form of a white and highly viscous emulsion of 35 per cent strength. The urethane salt corresponds to the formula:

$$C_{18}H_{37}OOC-N\begin{subarray}{l}C_4H_9\\ C_2H_4-O-SO_3Na\end{subarray}$$

and possesses excellent wetting and dispersing properties.

Example 6

95 parts of iso-butanol amine sulphuric ester are dissolved in 150 parts of water and 25 parts of magnesium oxide are added to the solution. 110 parts of chloro-carbonic ester of a mixture of alcohols mainly consisting of lauryl alcohol, are allowed to flow in while cooling to about 10° C. The mixture is then stirred for several hours at about 25° C. A clear solution of about 40 per cent strength of the magnesium salt of a mixture of urethane sulphuric esters is obtained, which salt corresponds to the formula:

$$\left(R-O-OC-NH-C_2H_4-CH\begin{subarray}{l}CH_3\\ O-SO_3\end{subarray}\right)_2Mg$$

R being the radicle of lauric and the other alcohols employed.

Example 7

360 parts of chloro-formic acid ester of chloro-octodecyl alcohol (obtainable by leading chlorine into the chloroformic acid ester of octodecyl alcohol) are introduced at about 40° C. into a solution of 80 parts of caustic soda and 180 parts of mono-butanol amine sulphuric ester in 350 parts of water while stirring. When the condensation is completed, the sodium salt of the urethane sulphuric ester having the constitution:

$$O=C\begin{subarray}{l}NH-CH_2-CH_2-CH-O-SO_3Na\\ \phantom{NH-CH_2-CH_2-}|\\ \phantom{NH-CH_2-CH_2-}CH_3\\ O-C_{18}H_{35}-Cl\end{subarray}$$

is obtained which has a good washing power.

What we claim is:—

1. The process for the production of agents, suitable as assistants in the textile industry, which comprises acting on a sulphuric ester of a hydroxy-alkyl amine, containing at least one hydrogen atom attached to a nitrogen atom, with an organic halogen compound corresponding to the formula R—COX, in which X is a halogen atom and R an organic radicle selected from the group consisting of alkyl, aryl, alkoxy, halogen alkoxy, halogen alkyl and hydroxy alkyl radicles in the presence of a metal compound having an alkaline reaction.

2. The process for the production of agents, suitable as assistants in the textile industry, which comprises acting at from about 10° below zero C. to about 75° C. on a sulphuric ester of a hydroxy-alkyl amine, containing at least one hydrogen atom attached to a nitrogen atom, with an organic halogen compound corresponding to the formula R—COX, in which X is a halogen atom and R an organic radicle selected from the group consisting of alkyl, aryl, alkoxy, halogen alkoxy, halogen alkyl and hydroxy alkyl radicles in the presence of a metal compound having an alkaline reaction.

3. The process for the production of agents, suitable as assistants in the textile industry, which comprises acting at from about 10° below zero C. to about 75° C. on a sulphuric ester of a hydroxy-alkyl amine containing at least one hydrogen atom attached to a nitrogen atom, with an organic halogen compound corresponding to the formula R—COX, in which X is a halogen atom and R an organic radicle selected from the group consisting of alkyl, aryl, alkoxy, halogen alkoxy, halogen alkyl and hydroxy alkyl radicles in the presence of a metal compound having an alkaline reaction and of water.

4. The process for the production of agents, suitable as assistants in the textile industry, which comprises acting at from about 10° below zero C. to about 75° C. on a sulphuric ester of a hydroxy-alkyl amine containing at least one hydrogen atom attached to a nitrogen atom, with an organic halogen compound corresponding to the formula R—COX, in which X is a halogen atom and R an organic radicle selected from the group consisting of alkyl, aryl, alkoxy, halogen alkoxy, halogen alkyl and hydroxy alkyl radicles, in the presence of water and of about 2 equivalent proportions of a metal compound having an alkaline reaction per each molecular proportion of the said sulphuric ester.

5. The process for the production of agents suitable as assistants in the textile industry, which comprises acting at from about 10° below zero C. to about 75° C. on a sulphuric ester of a hydroxy-alkyl amine containing at least one hydrogen atom attached to a nitrogen atom, with an organic halogen compound corresponding to the formula R—COX, in which X is a halogen atom and R an organic radicle selected from the group consisting of alkyl, aryl, alkoxy, halogen alkoxy, halogen alkyl and hydroxy alkyl radicles in the presence of water and of about 2 equivalent proportions of an alkali metal compound having an alkaline reaction per each molecular proportion of the said sulphuric ester.

6. The process for the production of agents, suitable as assistants in the textile industry, which comprises acting at from about 5° below zero C. to about 75° C. on a sulphuric ester of a hydroxy-alkyl amine containing at least one hydrogen atom attached to a nitrogen atom, with an organic halogen compound corresponding to the formula R—COX, in which X is a halogen atom and R an organic radicle selected from the group consisting of alkyl, aryl, alkoxy, halogen alkoxy, halogen alkyl and hydroxy alkyl radicles, in the presence of water and about 2 equivalent proportions of caustic soda for each molecular proportion of the said sulphuric ester.

7. The process for the production of agents, suitable as assistants in the textile industry, which comprises acting on a sulphuric ester of a hydroxy-alkyl amine containing at least one hydrogen atom attached to a nitrogen atom, with an organic halogen compound corresponding to the formula R—COCl, in which R is an organic radicle selected from the group consisting of alkyl, aryl, alkoxy, halogen alkoxy, halogen alkyl and hydroxy alkyl radicles in the presence of a metal compound having an alkaline reaction.

8. The process for the production of agents, suitable as assistants in the textile industry, which comprises acting on a sulphuric ester of a hydroxy-alkyl amine containing at least one hydrogen atom attached to a nitrogen atom, with an aliphatic acid chloride in the presence of a metal compound having an alkaline reaction.

9. The process for the production of agents, suitable as assistants in the textile industry, which comprises acting on a sulphuric ester of a hydroxy-alkyl amine containing at least one hydrogen atom attached to a nitrogen atom, with a chloride of a fatty acid of vegetal origin in the presence of a metal compound having an alkaline reaction.

10. The process for the production of agents, suitable as assistants in the textile industry, which comprises acting on a sulphuric ester of a hydroxy-alkyl amine containing at least one hydrogen atom attached to a nitrogen atom with stearic chloride in the presence of a metal compound having an alkaline reaction.

11. The process for the production of agents, suitable as assistants in the textile industry, which comprises acting on a sulphuric ester of a hydroxy-alkyl amine containing at least one hydrogen atom attached to a nitrogen atom with coconut oil fatty acid chloride in the presence of a metal compound having an alkaline reaction.

12. The process for the production of agents, suitable as assistants in the textile industry, which comprises acting on a sulphuric ester of a hydroxy-alkyl amine containing at least one hydrogen atom attached to a nitrogen atom with the chloro-formic acid ester of chloro-octodecyl alcohol in the presence of a metal compound having an alkaline reaction.

13. The process for the production of agents, suitable as assistants in the textile industry, which comprises acting on a sulphuric ester of an ethanol amine containing at least one hydrogen atom attached to a nitrogen atom, with an organic halogen compound corresponding to the formula R—COX, in which X is a halogen atom and R an organic radicle selected from the group consisting of alkyl, aryl, alkoxy, halogen alkoxy, halogen alkyl and hydroxy alkyl radicles in the presence of a metal compound having an alkaline reaction.

14. The process or the production of agents suitable as assistants in the textile industry, which comprises acting on the sulphuric ester of a mono-ethanol amine with an organic halogen compound corresponding to the formula R—COX, in which X is a halogen atom and R an organic radicle selected from the group consisting of alkyl, aryl, alkoxy, halogen alkoxy, halogen alkyl and hydroxy alkyl radicles in the presence of a metal compound having an alkaline reaction.

15. The process for the production of agents, suitable as assistants in the textile industry, which comprises acting on the sulphuric ester of a mono-ethanol amine with an organic halogen compound corresponding to the formula R—COCl, in which R is an organic radicle selected from the group consisting of alkyl, aryl, alkoxy, halogen alkoxy, halogen alkyl and hydroxy alkyl radicles in the presence of a metal compound having an alkaline reaction.

16. The process for the production of agents, suitable as assistants in the textile industry, which comprises acting on the sulphuric ester of a mono-ethanol amine with an aliphatic acid chloride in the presence of a metal compound having an alkaline reaction.

17. The process for the production of agents, suitable as assistants in the textile industry, which comprises acting on the sulphuric ester of mono-ethanol amine with stearic chloride in the presence of water and about 2 molecular proportions of caustic soda for each molecular proportion of the said sulphuric ester.

18. The process for the production of agents, suitable as assistants in the textile industry, which comprises acting on the sulphuric ester of n-butyl ethanol amine with coconut oil fatty acid chloride in the presence of water and of 1 molecular proportion of sodium carbonate.

19. The process for the production of agents, suitable as assistants in the textile industry, which comprises acting on the sulphuric ester of mono-butanol amine with the chloro-formic acid ester of chloro-octodecyl alcohol in the presence of an aqueous solution of 2 molecular proportions of caustic soda.

20. Compounds, corresponding to the general formula $$Alp-CO-\overset{Z}{\underset{|}{N}}-Alk-OSO_3X$$

in which Alp is an alkyl, alkoxy, halogen-alkyl, halogen-alkoxy or hydroxy-alkyl radicle, Z is an alkyl, hydroxy-alkyl, aryl or cycloalkyl radicle, Alk is an alkylene radicle and X is a hydrogen atom or a metal.

21. Compounds, corresponding to the general formula $$Alp-CO-\overset{Z}{\underset{|}{N}}-Alk-OSO_3X$$

in which Alp is an alkyl, halogen-alkyl or hydroxy-alkyl radicle connected to -CO by an oxygen atom contained therein, Z is a hydrogen atom or an alkyl, hydroxy-alkyl, aryl or cycloalkyl radicle, Alk is an alkylene radicle and X is a hydrogen atom or a metal.

22. Compounds, corresponding to the general formula $$Alp-CO-\overset{Z}{\underset{|}{N}}-Alk-OSO_3X$$

in which Alp is a halogen-containing alkyl radicle connected to -CO by an oxygen atom contained therein, Z is a hydrogen atom or an alkyl, hydroxy-alkyl, aryl or cycloalkyl radicle, Alk is an alkylene radicle and X is a hydrogen atom or a metal.

23. Compounds, corresponding to the general formula $$Alp-CO-\overset{Z}{\underset{|}{N}}-Alk-OSO_3X$$

in which Alp is a chlorine-containing alkyl radicle connected to -CO by an oxygen atom contained therein, Z is a hydrogen atom or an alkyl, hydroxy-alkyl, aryl or cycloalkyl radicle, Alk is an alkylene radicle and X is a hydrogen atom or a metal.

24. The urethane derivative corresponding to the formula $$C_4H_9-O-CO-NH-CH_2-CH_2-\underset{\underset{CH_3}{|}}{CH}-OSO_3X$$

in which X is a hydrogen atom or a metal.

25. The urethane derivative corresponding to the formula $$C_{18}H_{37}-OOC-N\underset{C_2H_4-O-SO_3X}{\overset{C_4H_9}{<}}$$

in which X is a hydrogen atom or a metal.

26. The urethane derivative corresponding to the formula $$OC\underset{O-C_{18}H_{36}-Cl}{\overset{NH-CH_2-CH_2-CH_2-CH_2-O-SO_3X}{<}}$$

in which X is a hydrogen atom or a metal.

HEINRICH ULRICH.
PAUL KOERDING.